(12) United States Patent
Taguchi et al.

(10) Patent No.: US 8,931,782 B2
(45) Date of Patent: Jan. 13, 2015

(54) SEAL STRUCTURE

(75) Inventors: Arata Taguchi, Yokohama (JP); Midori Kondo, Fujisawa (JP); Masatoshi Hada, Nagoya (JP)

(73) Assignees: Nissan Motor Co., Ltd., Yokohama (JP); Aichi Machine Industry Co., Ltd., Nagoya (JP)

( * ) Notice: Subject to any disclaimer, the term of this patent is extended or adjusted under 35 U.S.C. 154(b) by 1352 days.

(21) Appl. No.: 10/954,200

(22) Filed: Oct. 1, 2004

(65) Prior Publication Data

US 2005/0285351 A1 Dec. 29, 2005

(30) Foreign Application Priority Data

Oct. 10, 2003 (JP) .................. 2003-351658

(51) Int. Cl.
 F16J 15/06 (2006.01)
 F02F 11/00 (2006.01)
 F16J 15/14 (2006.01)
 F01M 11/00 (2006.01)

(52) U.S. Cl.
 CPC ............... *F02F 11/00* (2013.01); *F16J 15/062* (2013.01); *F16J 15/14* (2013.01); *F01M 2011/0062* (2013.01)
 USPC ........................................................ 277/316

(58) Field of Classification Search
 USPC ........................................................ 277/316
 See application file for complete search history.

(56) References Cited

U.S. PATENT DOCUMENTS

| | | | | |
|---|---|---|---|---|
| 2,926,937 A | * | 3/1960 | Parsons ......................... | 285/350 |
| 4,396,200 A | * | 8/1983 | Ukai et al. .................... | 277/598 |
| 4,501,432 A | * | 2/1985 | Kuniyoshi et al. ............ | 277/591 |
| 4,640,432 A | * | 2/1987 | Tate et al. ...................... | 220/678 |
| 4,648,740 A | * | 3/1987 | Carlson ........................... | 404/25 |
| 4,832,349 A | * | 5/1989 | Kawai et al. ................... | 277/591 |
| 5,855,397 A | * | 1/1999 | Black et al. .................... | 285/93 |
| 5,957,464 A | * | 9/1999 | Elliott ........................... | 277/608 |
| 6,478,305 B1 | * | 11/2002 | Iwata ............................. | 277/591 |
| 6,497,413 B1 | * | 12/2002 | Schmatz ........................ | 277/313 |
| 6,707,678 B2 | * | 3/2004 | Kobayashi et al. ........... | 361/752 |

(Continued)

FOREIGN PATENT DOCUMENTS

| | | |
|---|---|---|
| CN | 1207457 A | 2/1999 |
| DE | 19902817 A | 7/2000 |

(Continued)

OTHER PUBLICATIONS

An English translation of the Japanese Action of corresponding Japanese Application No. 2003-351658, dated Jan. 19, 2010.

*Primary Examiner* — Kristina Fulton
(74) *Attorney, Agent, or Firm* — Global IP Counselors, LLP (57) ABSTRACT

An upper oil pan of an engine includes a flange with an oil pan abutment surface that is fixedly coupled to a flange formed on a cylinder block. The oil pan abutment surface comprises a flat portion that is substantially parallel to a cylinder block abutment surface of the cylinder block, a slanted portion that is slanted with respect to the flat portion, and a vertical wall portion connecting the flat portion and the slanted portion. The vertical wall portion is formed substantially perpendicular to the flat portion. The cylinder block and the upper oil pan are fixedly coupled together via an interposed liquid gasket. Thus, the seal structure in which the liquid gasket is adequately cured is provided, and sufficient sealing properties can be obtained with a small amount of material used.

5 Claims, 6 Drawing Sheets

(56) References Cited

U.S. PATENT DOCUMENTS

| | | | |
|---|---|---|---|
| 6,882,300 B2 * | 4/2005 | Nakamura et al. | 342/7 |
| 2003/0214429 A1 * | 11/2003 | Nakamura et al. | 342/5 |
| 2003/0221651 A1 * | 12/2003 | Ito et al. | 123/184.61 |
| 2004/0233573 A1 * | 11/2004 | Kuwajima et al. | 360/97.01 |

FOREIGN PATENT DOCUMENTS

| | | | |
|---|---|---|---|
| DE | 19907938 A | | 9/2000 |
| FR | 2813922 A | | 3/2002 |
| JP | S58-38070 U | | 3/1983 |
| JP | 58152151 A | | 9/1983 |
| JP | H03-186669 | | 8/1991 |
| JP | 4-17761 | * | 1/1992 |
| JP | H06-174104 A | | 6/1994 |
| JP | 8-320071 | * | 12/1996 |
| JP | 8-326922 | * | 12/1996 |
| JP | 9-53449 | * | 2/1997 |
| JP | 10-274098 | * | 10/1998 |
| JP | 11-37298 | * | 2/1999 |
| JP | 11-173424 | | 6/1999 |
| JP | 2000-009229 A | | 1/2000 |
| JP | 2000-145972 A | | 5/2000 |

* cited by examiner

SEAL STRUCTURE

BACKGROUND OF THE INVENTION

1. Field of the Invention

The present invention relates to a seal structure. More specifically, the present invention relates to a liquid gasket seal structure utilized in an oil seal utilized in an engine between a cylinder block and an upper oil pan and/or between the upper oil pan and a lower oil pan, or the like.

2. Background Information

One example of conventional liquid gasket seal structures is disclosed in Japanese Laid-Open Patent Publication No. H11-173424 that uses a form-in-place gasket for an oil seal structure of an engine. Specifically, in such conventional liquid gasket seal structure, a groove is provided near the center of an abutment surface of a flange formed on either one of two members to be coupled together via a liquid gasket that functions as the form-in-place gasket. This groove serves as a reservoir portion of the liquid gasket when the two members are coupled together. More specifically, when the engine is assembled, the liquid gasket is applied to the abutment surface of the flange of one of the two members, and the two members are fixedly coupled together with a bolt. The liquid gasket is flattened out by the clamping or compression force of the bolt, which causes to form a thin gasket film between the abutment surfaces of the two members while the excess of the liquid gasket flows into the reservoir portion formed by the groove. The liquid gasket flowing into the groove forms an expanded portion of the gasket. The liquid gasket is cured after a prescribed drying time is elapsed, which cases to form an elastic gasket between the two members.

However, with the conventional liquid gasket seal structure described above has some drawbacks. Specifically, since the reservoir portion of the liquid gasket is provided near the center of the abutment surface of the flange, the liquid gasket in the reservoir portion is not sufficiently exposed to air during the drying time. Thus, the liquid gasket collected in the reservoir portion is sometimes not satisfactorily cured even after the prescribed drying time has elapsed. Especially, a common liquid gasket that uses silicone or the like as a raw material is cured by exposure to air.

In order to maintain the area of contact between the liquid gasket and the air, the reference mentioned above further discloses another conventional liquid gasket seal structure in which one of the two members include a flat portion disposed in the middle of an abutment surface of a flange, and a pair of slanted portions disposed on both sides of the flat portion that are slanted with respect to the flat portion. In such structure, a reservoir portion of the liquid gasket is formed on each side of the abutment surface.

In view of the above, it will be apparent to those skilled in the art from this disclosure that there exists a need for an improved liquid gasket seal structure. This invention addresses this need in the art as well as other needs, which will become apparent to those skilled in the art from this disclosure.

SUMMARY OF THE INVENTION

In the conventional liquid gasket seal structure having the reservoir portion on each side of the abutment surface, the liquid gasket in the reservoir portions can be sufficiently exposed to air and satisfactorily cured. However, since the liquid gasket is distributed between two reservoir portions, the cured liquid gasket has a low proof stress. Moreover, there is a risk that sealing properties that are commensurate with the amount of liquid gasket used cannot be obtained.

Accordingly, one object of the present invention is to provide a seal structure in which an adequate area of contact with air is maintained so that the liquid gasket is fully cured while sufficient sealing properties can be obtained with a small amount of liquid gasket used.

In order to achieve the above and other objects of the present invention, a seal structure is provided that comprises a first member, a second member and a liquid gasket. The first member includes a first flange having a first abutment surface. The second member includes a second flange having a second abutment surface configured and arranged to be fixedly coupled to the first flange of the first member. The second abutment surface includes a flat portion and a slanted portion. The flat portion is arranged substantially parallel to the first abutment surface of the first flange, and extends from a first transverse edge of the second abutment surface of the second flange. The slanted portion is slanted with respect to the flat portion, and extends from a second transverse edge of the second abutment surface that is opposite from the first transverse edge such that a distance between the first abutment surface and the second abutment surface becomes greater as moving away from the flat portion toward the second transverse edge to form a liquid gasket reservoir section. The liquid gasket is disposed between the first abutment surface of the first flange and the second abutment surface of the second flange to form a seal between the first and second abutment surfaces.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
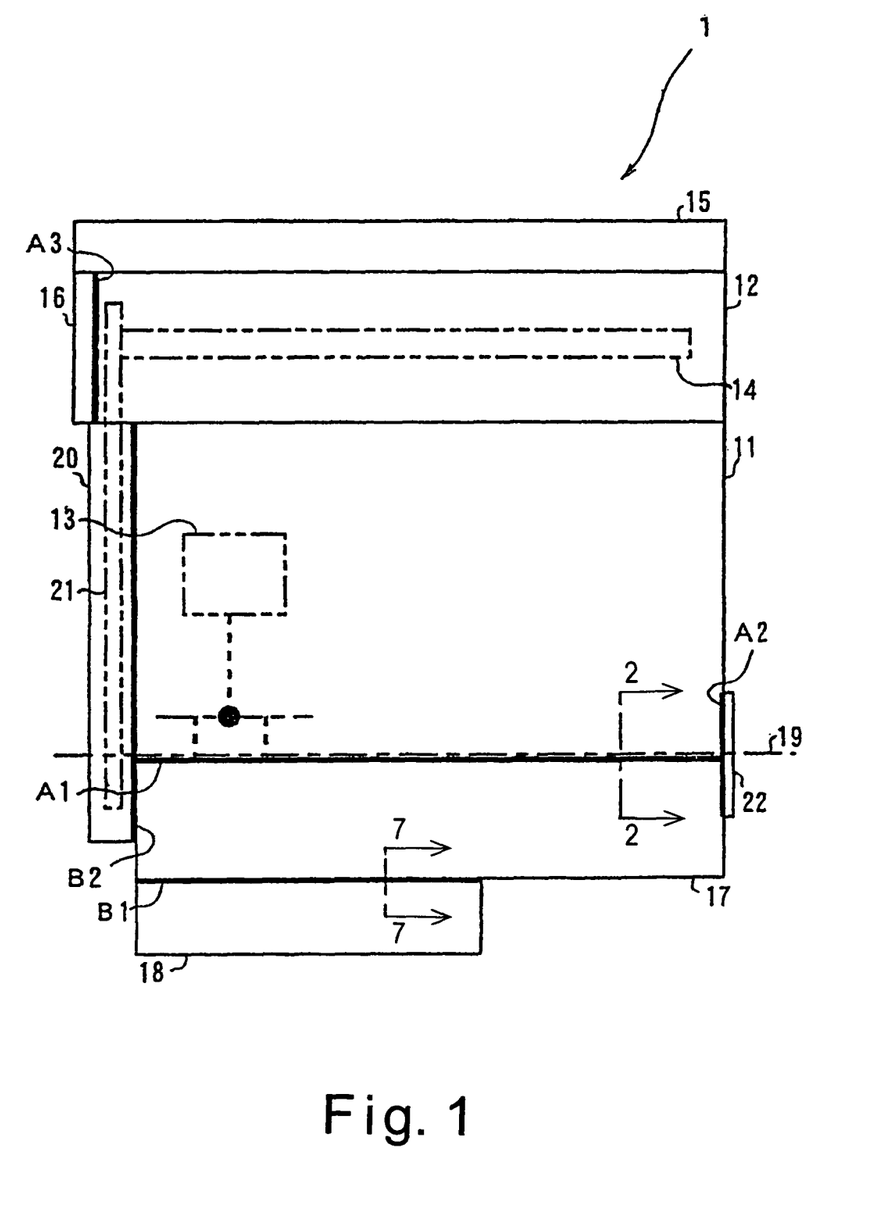
FIG. 1 is a schematic view of an engine in which a seal structure is utilized in accordance with a first embodiment of the present invention.

Referring initially to FIG. 1, a seal structure is illustrated in accordance with a preferred embodiment of the present invention. In the following descriptions, the seal structure according to the present invention is referred to as a "chamfer seal structure".

FIG. 1 is a schematic view of an engine 1 for an automobile utilizing the chamfer seal structure according to the first embodiment of the present invention. The left side in FIG. 1 is the front side of the engine 1, and the right side is the rear side of the engine 1.

As seen in FIG. 1, a main body of the engine 1 comprises a cylinder head 12 and a cylinder block 11. The cylinder head 12 is fixedly coupled to a top side of the cylinder block 11. Several pistons 13 (only one shown for the illustration purpose) are slidably disposed in the cylinder block 11 so that each one of the pistons 13 forms a combustion chamber between the piston 13 and the cylinder head 12. The cylinder head 12 includes an axle bearing for a camshaft 14, a rocker cover 15 that is fixedly coupled to the topside of the cylinder head 12, and a front cover 16 that is fixedly coupled to the front side of the cylinder head 12.

Moreover, the engine 1 includes an upper oil pan 17 that is fixedly coupled to the underside of the cylinder block 11, and a lower oil pan 18 that is fixedly coupled to the underside of the upper oil pan 17 as seen in FIG. 1. The upper oil pan 17 and the cylinder block 11 are configured and arranged to form a crankcase in which a crankshaft 19 is accommodated. A center axis of the crank shaft 19 is indicated by a dashed line in FIG. 1. Lubricating oil for the engine 1 is stored in the lower oil pan 18.

A chain case 20 is fixedly coupled to the front side of the cylinder block 11 and the upper oil pan 17 to retain a chain 21 therein. As seen in FIG. 1, the chain 21 extends between the crankshaft 19 and the camshaft 14 so that the output of the engine 1 is transmitted from the crankshaft 19 to the camshaft 14. Moreover, a rear oil seal retainer 22 is fixedly coupled to the rear side of the cylinder block 11.

The locker cover 15, the front cover 16 and the chain case 20 are configured and arranged to block off internal spaces inside the engine 1 (e.g., a space inside the cylinder head 12 and spaces inside the upper oil pan 17 and the lower oil pan 18) from the outside portion of the engine 1 in an airtight or water tight manner. Therefore, the lubricating oil is prevented from leaking outside of the engine 1.

The engine 1 preferably utilizes the chamfer seal structure of the present invention in an oil seal A1 between the cylinder block 11 and the upper oil pan 17. In the present embodiment, both of the cylinder block 11 and the upper oil pan 17 are preferably die-formed members. When referring to the oil seal A1, the cylinder block 11 preferably constitutes a first member and the upper oil pan 17 preferably constitutes a second member.

Figure 2:
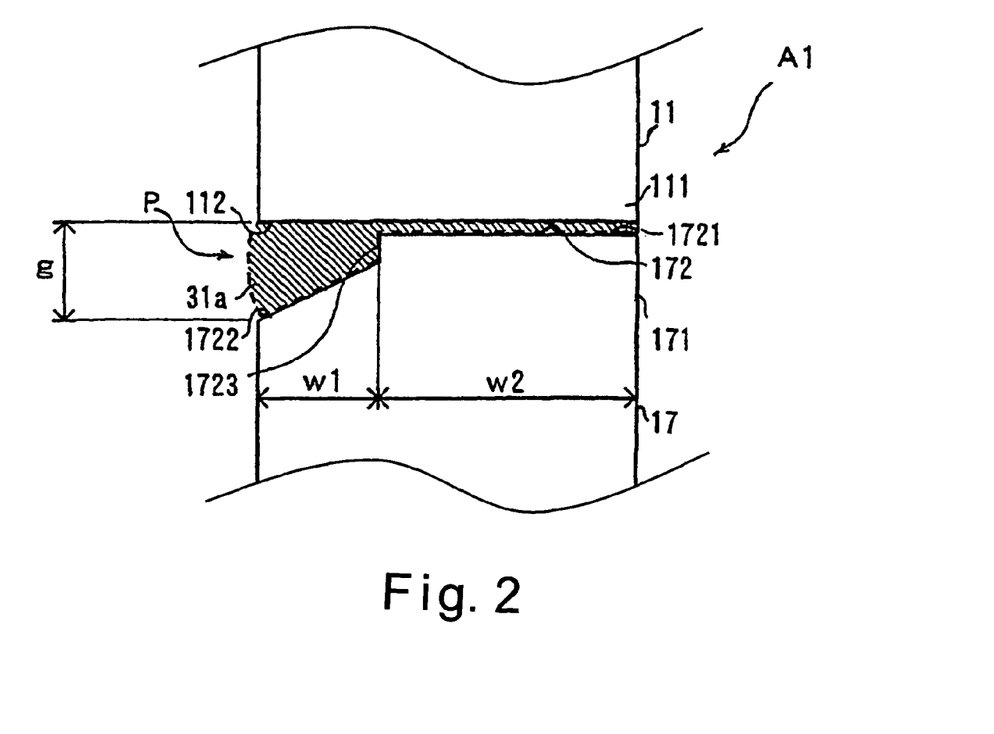
FIG. 2 is an enlarged partial cross sectional view of an oil seal portion between a cylinder block and an upper oil pan of the engine where the seal structure is used in accordance with the first embodiment of the present invention taken along a section line 2-2 in FIG. 1.

FIG. 2 is an enlarged cross sectional view of the oil seal A1 between the cylinder block 11 and the upper oil pan 17 taken along a section line 2-2 in FIG. 1 in a plane that is orthogonal to the longitudinal direction of the engine 1 (i.e., the direction of cylinder alignment).

As seen in FIG. 2, the cylinder block 11 includes an annular flange 111 (first flange) that is substantially continuously formed in the bottom periphery portion of the cylinder block 11, and a bottom surface of the flange 111 comprises an annular cylinder block abutment surface 112 that faces against the upper oil pan 17. The upper oil pan 17 includes an annular flange 171 (second flange) that is substantially continuously formed in an upper peripheral portion of the upper oil pan 17, and a top surface of the flange 171 comprises an annular oil pan abutment surface 172 that faces against the cylinder block 11. The cylinder block 11 and the upper oil pan 17 are preferably fastened together by a plurality of bolts, while the cylinder block abutment surface 112 of the cylinder block 11 and the oil pan abutment surface 172 of the upper oil pan 17 are sealed together via a liquid gasket 31a as described in more detail later. The flange 111 of the cylinder block 11 and the flange 171 of the upper oil pan 17 are sealed together to form an enclosed area that defines inside of the engine 1. As mentioned above, the cylinder block 11 with the flange 111 and the upper oil pan 17 with the flange 171 are both die-formed. The cylinder block abutment surface 112 and the oil pan abutment surface 172 are preferably finished using a milling cutter or the like.

In the present embodiment, the cylinder block abutment surface 112 is preferably formed as a flat surface that extends between transverse edges of the flange 111 substantially parallel to a plane orthogonal to the vertical direction of the engine 1. On the other hand, the oil pan abutment surface 172 preferably comprises three planar portions disposed on three planes.

More specifically, the oil pan abutment surface 172 preferably includes a flat portion 1721, a slanted portion 1722 and a vertical wall portion 1723. The flat portion 1721 is disposed on a first plane that is substantially orthogonal to the vertical direction of the engine 1 and extends inwardly from an external transverse edge of the oil pan abutment surface 172 with respect to inside and outside direction of the upper oil pan 17. Since the first plane is substantially orthogonal to the vertical direction of the engine 1, the flat portion 1721 is disposed substantially parallel to the cylinder block abutment surface 112 as seen in FIG. 2. The slanted portion 1722 is preferably disposed on a second plane that is slanted with respect to the first plane. The slanted portion 1722 preferably extends outwardly from an inner transverse edge of the oil pan abutment surface 172, and is slanted such that a distance or gap g between the cylinder block abutment surface 112 and the oil pan abutment surface 172 widens as the slanted portion 1722 draws closer to the inner transverse edge of the oil pan abutment surface 172 of the upper oil pan 17. A space formed between the slanted portion 1722 and the cylinder block abutment surface 112 serves as a reservoir portion P for the liquid gasket 31a that is disposed between the oil pan abutment surface 172 and the cylinder block abutment surface 112. The vertical wall portion 1723 is preferably disposed on a third plane that is substantially orthogonal to the first plane. The vertical wall portion 1723 extends between an inner edge of the flat portion 1721 and an outer edge of the slanted portion 1722. As mentioned above, the liquid gasket 31a is disposed between the cylinder block abutment surface 112 and the oil pan abutment surface 172 and cured to fixedly couple the flange 111 of the cylinder block 11 and the flange 171 of the upper oil pan 17. Of course, it will be apparent to those skilled in the art from this disclosure that the vertical wall portion 1723 of the oil pan abutment surface 172 can be formed slanted with respect to the flat portion 1721 at a greater angle than the slanted portion 1722 instead of being perpendicular to the flat portion 1721 (slanted by an angle of 90°). However, an arrangement shown in FIG. 2 in which the vertical wall 1723 is arranged substantially perpendicular to the flat portion 1721 is more effective as described in more detail later.

Figure 3:
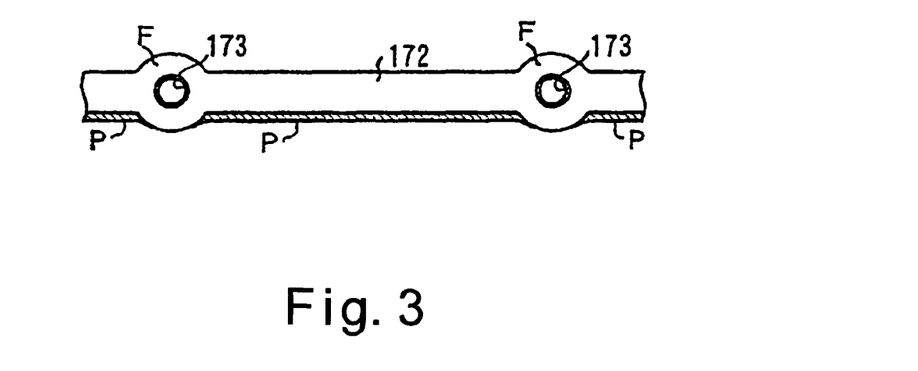
FIG. 3 is an enlarged partial top plan view of an oil pan abutment surface of the upper oil pan in accordance with the first embodiment of the present invention.

FIG. 3 is an enlarged partial top plan view of the upper oil pan 17 including the oil pan abutment surface 172. As seen in FIG. 3, the flange 171 of the upper oil pan 17 preferably includes a plurality of bolt fastening portions F. Each of the bolt fastening portions F includes a bolt insertion hole or bolt hole 173 for threadably receiving a bolt to fixedly couple the cylinder block 11 and the upper oil pan 17 together. In this embodiment, the chamfer seal structure of the present invention is preferably employed only in portions of the flange 171 other than the bolt fastening portions F. In other words, the slanted portion 1722 and the reservoir portion P for the liquid gasket 31a are formed only in portions of the flange 171 other than the bolt fastening portions F. In other words, the flange 171 of the upper oil pan 171 preferably has a substantially constant cross section throughout the annular circumference of the flange 171 as shown in FIG. 2 except for the bolt fastening portions F. The term "bolt fastening portions F" denotes the portions of the flange 171 where the bolt holes 173 are formed. More specifically, with respect to the present embodiment, the term "bolt fastening portions F" refers to the portions in the oil pan abutment surface 172 that extend adjacent to the bolt holes 173 towards the inner edge and/or the outer edge of the flange 171 of the upper oil pan 17 for reinforcing the bolt holes 173 in accordance with the shape of the bolt holes 173. Any seal structure other than the chamfer seal structure can be employed in the bolt fastening portions F. However, a gasket is not particularly necessary for the bolt fastening portions F because a significant clamping force is exerted in the bolt fastening portions F by the bolts that are inserted into the bolt holes 173.

Figure 4:
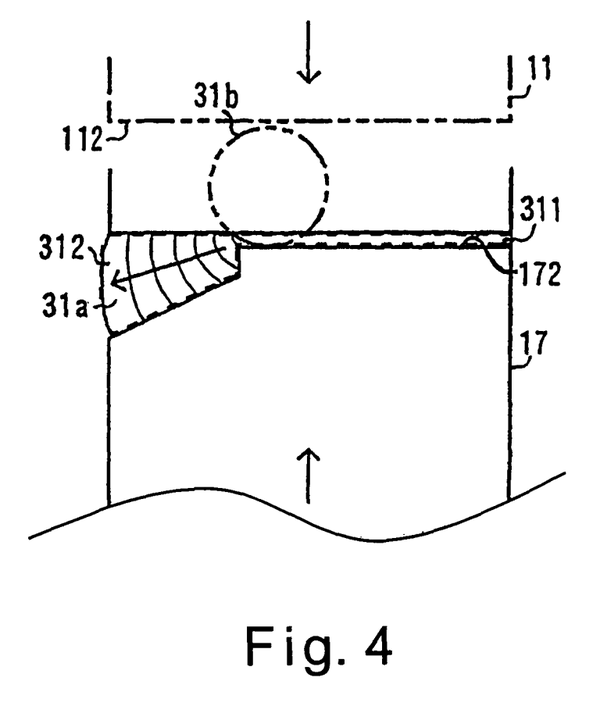
FIG. 4 is a diagrammatic view illustrating how a liquid gasket deforms during coupling the cylinder block and the upper oil pan in accordance with the first embodiment of the present invention.

FIG. 4 is a diagrammatic view illustrating how an uncured liquid gasket 31b deforms and becomes the cured liquid gasket 31a when the cylinder block 11 and the upper oil pan 17 are fastened by the bolts.

As seen in FIG. 4, the uncured liquid gasket 31b is applied to one side of the flat portion 1721 that is closer to the vertical wall portion 1723 in the oil pan abutment surface 172. The cylinder block abutment surface 112 and the oil pan abutment surface 172 are configured and arranged to be adhesively coupled together by the liquid gasket 31b and fixedly fastened by the bolts. As the cylinder block abutment surface 112 and the oil pan abutment surface 172 draw closer to each other, the liquid gasket 31b is flattened out between the cylinder block abutment surface 112 and the oil pan abutment surface 172 and fills up a space therebetween. Although the liquid gasket 31b stretches into a space between the cylinder block abutment surface 112 and the flat portion 1721 of the oil pan abutment surface 172, most of the liquid gasket 31b flows into the reservoir portion P formed between the cylinder block abutment surface 112 and the slanted portion 1722 of the oil pan abutment surface 172. After the bolts are fastened, a prescribed drying time is allotted to cure the liquid gasket 31b so that the uncured liquid gasket 31b becomes the cured liquid gasket 31a. As seen in FIG. 4, the cured liquid gasket 31 a basically comprises a thin film portion 311 formed by the liquid gasket 31b that fills the space between the cylinder block abutment surface 112 and the flat portion 1721, and an expanded portion 312 formed by the liquid gasket 31b that fills the reservoir portion P.

Accordingly, by using the chamfer seal structure of the present invention in the oil seal A1 of the engine 1, the following effects can be basically obtained.

First, the slanted portion 1722 is provided near the one transverse side of the oil pan abutment surface 172 of the upper oil pan 17 with respect to the flat portion 1721, and the reservoir portion P for the liquid gasket 31a is formed between the cylinder block abutment surface 112 and the slanted portion 1722. Therefore, the liquid gasket 31a can be satisfactorily cured since the liquid gasket 31a disposed in the reservoir portion P is sufficiently exposed to air during the prescribed drying time.

Second, the reservoir portion P for the liquid gasket 31a is provided to only near the one transverse side of the oil pan abutment surface 172, and thus, the expanded section 312 of the liquid gasket 31a is formed on only the one transverse side of the oil pan abutment surface 172. Therefore, the proof stress property of the liquid gasket 31a for the amount of material (the uncured liquid gasket 31b) used can be increased, and the desired sealing properties can be obtained with a relatively small amount of material used.

Figure 5A:
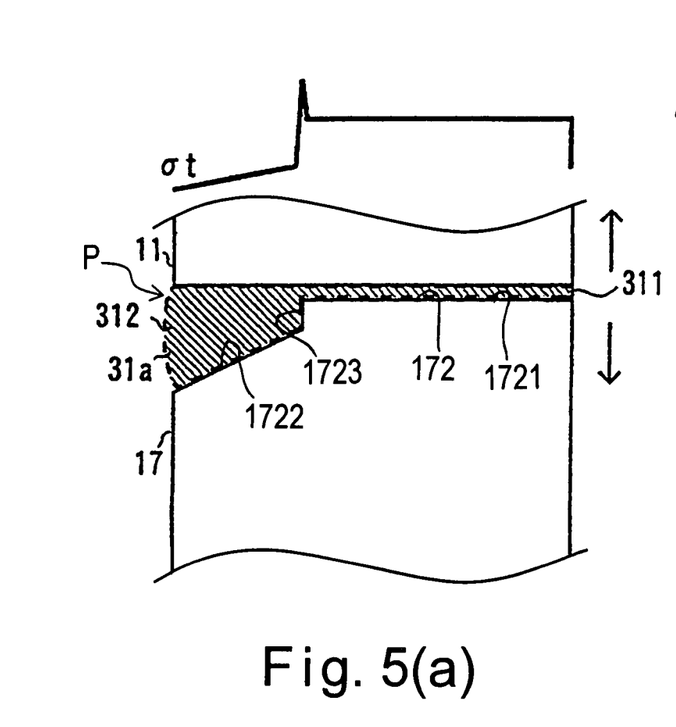
FIG. 5(a) is a schematic view illustrating a tensile stress of the liquid gasket of a chamfer seal structure in accordance with the first embodiment of the present invention.
Figure 5B:
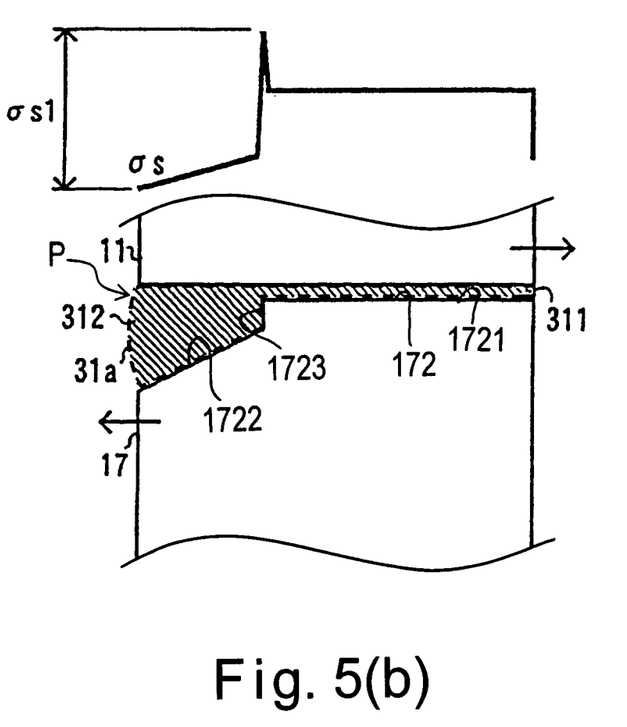
FIG. 5(b) is a schematic view illustrating a shearing stress of the liquid gasket of the chamfer seal structure in accordance with the first embodiment of the present invention.
Figure 6A:
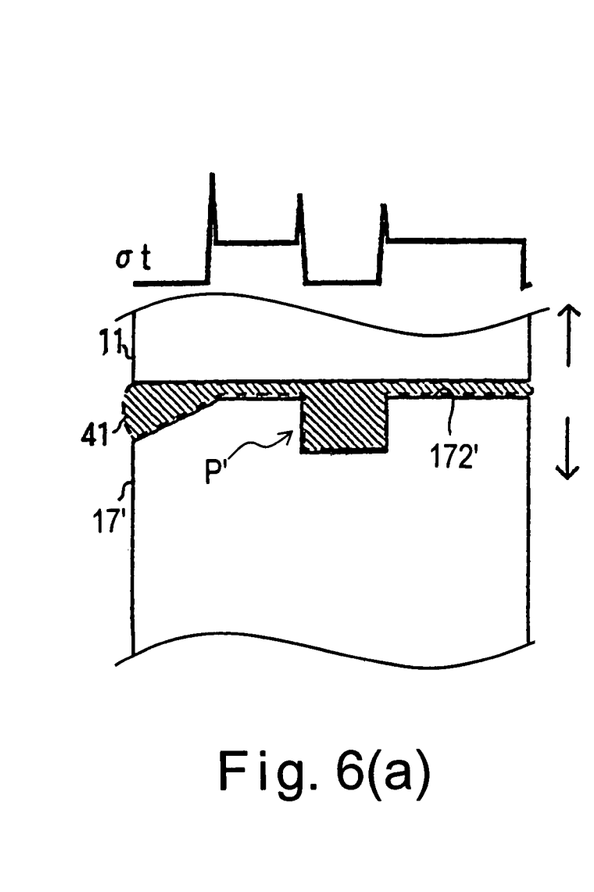
FIG. 6(a) is a schematic view illustrating a tensile stress of the liquid gasket of a comparison seal structure.
Figure 6B:
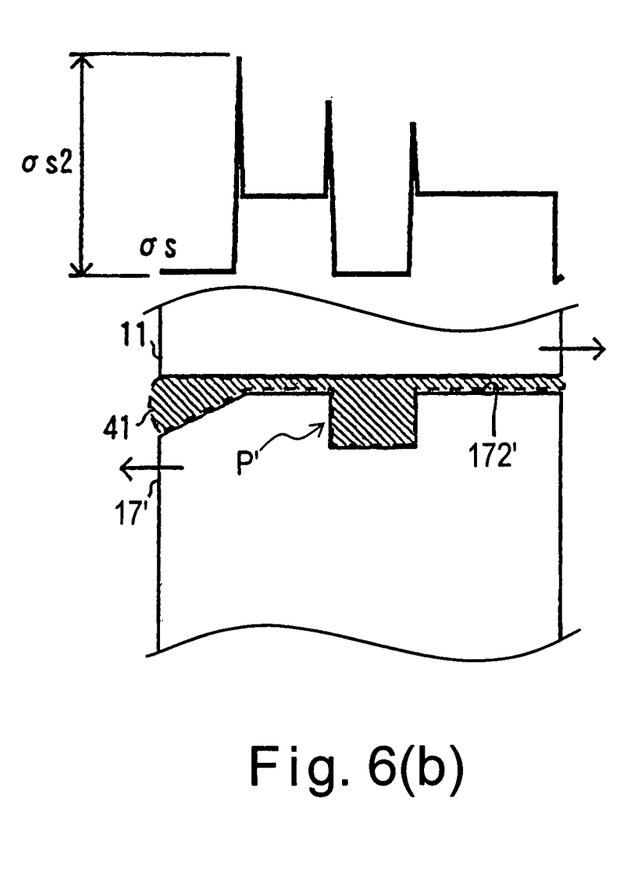
FIG. 6(b) is a schematic view illustrating a shearing stress of the liquid gasket of the comparison seal structure.

More specifically, FIGS. 5(a) to 6(b) show a comparison between the chamfer seal structure of the present invention and a comparison seal structure in a tensile stress $\sigma t$ and a shearing stress $\sigma s$ applied to the liquid gasket 31a when the upper oil pan 17 is displaced in the tensile direction (equivalent to the vertical direction of the engine 1) and shearing direction, respectively, with respect to the cylinder block 11. FIGS. 5(a) and 5(b) shows the tensile stress $\sigma t$ and the shearing stress $\sigma s$ in the case of the chamfer seal structure according to the present invention. FIGS. 6(a) and 6(b) show the tensile stress $\sigma t$ and the shearing stress $\sigma s$, respectively, in the case of the comparison seal structure in which a groove is provided near the center of an oil pan abutment surface 172' of an upper oil pan 17' to form a reservoir portion P'.

In the case of the chamfer seal structure of the present invention as shown in FIGS. 5(a) and 5(b), the number of concaved corners formed in the liquid gasket 31a is smaller than the number of concaved corners in the liquid gasket 41 of the comparison seal structure shown in FIG. 6. Thus, in the present invention, there are fewer points of stress accumulation in the liquid gasket 31a regardless of the direction of displacement (e.g., the tensile stress or the shearing stress). Accordingly, the possibility that cracking or other such damage will occur in the liquid gasket 31a is lower with the chamfer seal structure of the present invention, and the sealing properties of the liquid gasket 31a can be maintained over a longer period of time. Also, generally a greater stress as is applied to the liquid gasket 31a when the liquid gasket 31a is displaced in the shearing direction than in the tensile direction. Since the liquid gasket 31a is accumulated in one expanded section 312 in the chamfer seal structure of the present invention, the stress as generated in the liquid gasket 31a can be distributed within the expanded section 312, and the localized stress $\sigma s1$ can be substantially suppressed to a minimum value.

Third, the slanted portion 1722 is provided to the oil pan abutment surface 172 so that the reservoir portion P of the liquid gasket 31a is formed to flare inwardly toward the inner portion of the upper oil pan 17 with respect to the inside and outside direction of the upper oil pan 17. Therefore, the uncured liquid gasket 31b gradually widens along a surface of the slanted portion 1722 and can fill the reservoir portion P without any gaps when the cylinder block 11 and the upper oil pan 17 are fastened. Moreover, if a large amount of the uncured liquid gasket 31b spills into the upper oil pan 17, the spilled portion of the uncured liquid gasket 31b overflows or runs over and falls into the upper oil pan 17 and may clog up an oil strainer. However, in the present invention, the uncured liquid gasket 31b can be prevented from spilling into inside of the upper oil pan 17 by gradually enlarging the reservoir portion P in the direction that the liquid gasket 31b flows.

Fourth, the desired sealing properties of the liquid gasket 31a can be maintained even when manufacturing errors or irregularities occur in forming the upper oil pan 17 by providing the vertical wall portion 1723 to the oil pan abutment surface 172. The sealing properties of the chamfer seal structure is largely affected by a width w1 of the slanted portion 1722 (FIG. 2). Even when errors or the like occur in a location of the slanted portion 1722 (specifically, the height of the slanted portion 1722) in forming the upper oil pan 17, the occurrence of irregularities in the width w1 of the slanted portion 1722 can be avoided and a constant width w1 in the slanted portion 1722 can be ensured because of the presence of the vertical wall portion 1723. Moreover, a substantially constant width w2 of the flat portion 1721 can be ensured regardless of the height of the flat portion 1721. Accordingly, a high surface pressure can be applied between the cylinder block abutment surface 112 and the oil pan abutment surface 172 when the cylinder block 11 and the upper oil pan 17 are fastened.

Fifth, in the oil pan abutment surface 172 of the above explained embodiment, the vertical wall portion 1723 is provided perpendicularly to the flat portion 1721, and thus, a sharp corner is formed between the flat portion 1721 and the vertical wall portion 1723. Therefore, the corner between the flat portion 1721 and the vertical wall portion 1723 can be used as a marker when the uncured liquid gasket 31b is applied to the oil pan abutment surface 172. Accordingly, the uncured liquid gasket 31b can be easily applied to a suitable location on the oil pan abutment surface 172.

Sixth, since the vertical wall portion 1723 is provided to the oil pan abutment surface 172, the uncured liquid gasket 31b can be prevented from escaping or coming off from a coupling portion between the cylinder block 11 and the upper oil pan 17 during an air leak test. The air leak test is conducted after the cylinder block 11 and the upper oil pan 17 are fastened together and before the uncured liquid gasket 31b is completely cured. In the air leak test, a high pressure is preferably applied within the upper oil pan 17 and the oil seal A1 is inspected for leaks in a direction of leakage (i.e., from inside to outside of the engine 1). In the chamfer seal structure of the present invention, the uncured liquid gasket 31b can be prevented from escaping toward the outside of the upper oil pan 17 during the air leak test because the vertical wall portion 1723 functions as a barrier or block to the uncured liquid gasket 31b.

In the above explained embodiment, the chamfer seal structure is explained as being used in the oil seal A1 between the cylinder block 11 and the upper oil pan 17. Of course, it will be apparent to those skilled in the art from this disclosure that the chamfer seal structure of the present invention is not limited to the use in the oil seal A1. In fact, the chamfer seal structure of the present invention can also be utilized in an oil seal A2 between the cylinder block 11 and the rear oil seal retainer 22, and/or an oil seal A3 between the cylinder head 12 and the front cover 16 as seen in FIG. 1. When the chamfer seal structure of the present invention is utilized in the oil seal A2 and/or the oil seal A3, the same effects (six effects) described above can also be obtained. The rear oil seal retainer 22 is used for holding a rear oil seal for blocking off the inside of the crankcase from outside. Moreover, when a large bearing cap used as both an intake side bearing and an exhaust side bearing is employed as a bearing cap for supporting a journal that is disposed in the farthest front in the camshaft 14, the chamfer seal structure of the present invention can also be utilized in a oil seal portion between the bearing cap and the cylinder head 12.

Moreover, in the above explained embodiment, the chamfer seal structure is explained as being used between the cylinder block 11 and the upper oil pan 17 that are both die-formed members of the engine 1. Of course, it will be apparent to those skilled in the art from this disclosure that the present invention is not limited to be used in sealing two die-formed members.

Figure 7:
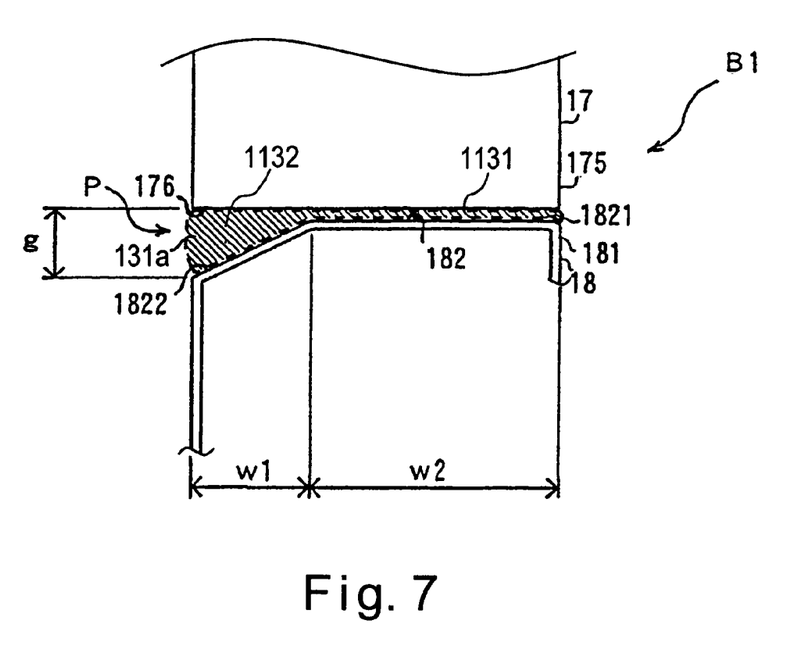
FIG. 7 is an enlarged partial cross sectional view of an oil seal portion between the upper oil pan and a lower oil pan of the engine where the seal structure is used between the upper oil pan and a lower oil pan of the engine in accordance with the first embodiment of the present invention taken along a section line 7-7 in FIG. 1.

FIG. 7 is an enlarged cross sectional view of the upper oil pan 17 and the lower oil pan 18 taken along a section line 7-7 in FIG. 1 in a plane that is orthogonal to the longitudinal direction of the engine 1.

As seen in FIG. 7, the upper oil pan 17 has an annular flange 175 (first flange) that is substantially continuously formed in the bottom peripheral portion of the upper oil pan 17. The lower oil pan 18 has an annular flange 181 (second flange) that is substantially continuously formed in the top peripheral portion of the lower oil pan 18. A bottom surface of the flange 175 of the upper oil pan 17 comprises an upper abutment surface 176 that faces against the lower oil pan 18. A top surface of the flange 181 of the lower oil pan 18 comprises a lower abutment surface 182 that faces against the upper oil pan 17. The upper oil pan 17 and the lower oil pan 18 are adhesively coupled together at the upper abutment surface 176 and the lower abutment surface 182 via a liquid gasket 131a, and are preferably fastened by a plurality of bolts to form an enclosed space that defines inside of the engine 1.

In the first member or the upper oil pan 17, the upper abutment surface 176 is formed as a substantially flat surface that is disposed on a plane orthogonal to the vertical direction of the engine 1. In the second member or the lower oil pan 18, the lower abutment surface 182 preferably comprises two planar surfaces. More specifically, the lower abutment surface 182 preferably includes a flat portion 1821 disposed on a first plane that is orthogonal to the vertical direction of the engine 1, and a slanted portion 1822 disposed on a second plane that is slanted with respect to the first plane. The flat portion 1821 extends inwardly from an external transverse edge of the lower abutment surface 182 with respect to inside and outside of the lower oil pan 18, and extends substantially parallel to the upper abutment surface 176 of the upper oil pan 17. The slanted portion 1822 preferably extends from an inner transverse edge of the flat portion 1821, and is slanted such that a distance or gap g between the upper abutment surface 175 and the lower abutment surface 182 widens as the slanted portion 1822 draws closer to the inner transverse edge of the flange 181 of the lower oil pan 18. A space formed between the slanted portion 1822 and the upper abutment surface 176 serves as the reservoir portion P of the liquid gasket 131a. In this embodiment, the lower abutment surface 182 of the lower oil pan 18 is not provided with a vertical wall portion such as the one formed on the oil pan abutment surface 172 of the upper oil pan 17 as explained above. The cured liquid gasket 131a is located between the upper abutment surface 176 and the lower abutment surface 182.

Similar to the oil seal A1 shown in FIG. 3, the chamfer seal structure of the present invention is preferably employed only in portions of the lower abutment surface 182 other than bolt fastening portions in the oil seal B1. More specifically, the flange 181 of the lower oil pan 18 has a substantially constant cross section throughout the annular circumference of the flange 181 as shown in FIG. 7 except for the bolt fastening portions formed on the abutment surface 182.

In the chamfer seal structure utilized in the oil seal B1, the first through third effects described above can be obtained.

Specifically, providing the slanted portion 1822 to only one side of the lower abutment surface 182 allows the liquid gasket 131*a* disposed in the reservoir portion P to be sufficiently exposed to air during the prescribed drying time. Thus, the liquid gasket 131*a* can be satisfactorily cured.

Also, forming an expanded section 1132 on only one transverse side of the liquid gasket 131*a* and accumulating the liquid gasket 131*a* on that side makes it possible to increase the proof stress of the liquid gasket 131*a* for the amount of material used. Moreover, the desired sealing properties with a relatively smaller amount of material used can be obtained.

Furthermore, forming the reservoir portion P of the liquid gasket 131*a* so that the reservoir portion P gradually expands towards the transverse inner edge of the flange 181 of the lower oil pan 18 by having the slanted portion 1822 makes it possible to fill the reservoir portion P with the liquid gasket 131*a* without any gaps when the upper oil pan 17 and lower oil pan 18 are fastened together. Also, the liquid gasket 131*a* can be prevented from spilling over into the lower oil pan 18.

Moreover, the chamfer seal structure of the present invention is not limited to the oil seal in the engine 1, but can also be applied to an oil seal structure used in a transmission coupled with the engine 1 or oil seal structures used in common industrial machinery in general.

Accordingly, with the chamfer seal structure of present invention, the liquid gasket 31*a* or 131*a* can be satisfactorily cured without the flat portion 1721 or 1821 hindering the contact between the air and the liquid gasket 31*a* or 131*a* in the reservoir portion P because the slanted portion 1722 or 1822 is provided on one transverse side of the second member. Also, since the expanded section 312 or 1312 is formed on only one side in the cured liquid gasket 31*a* or 131*a*, the proof stress property of the liquid gasket 31*a* or 131*a* for the amount of material used is higher, and the desired sealing property can be obtained with a less amount of material compared with the conventional seal structure in which an expanded section of the liquid gasket is formed on each side.

As used herein, the following directional terms "forward, rearward, above, downward, vertical, horizontal, below and transverse" as well as any other similar directional terms refer to those directions of an engine equipped with the present invention. Accordingly, these terms, as utilized to describe the present invention should be interpreted relative to an engine equipped with the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-351658. The entire disclosure of Japanese Patent Application No. 2003-351658 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A seal structure comprising:
   first engine portion means for forming a first planar abutment surface;
   second engine portion means for forming a second abutment surface with at least one fastening portion for fixedly coupling the first engine portion means and the second engine portion means by a fastening means, a first planar portion and a second slanted portion formed only in portions of the second abutment surface other than the at least one fastening portion; and
   sealing means for sealing the first and second abutment surfaces together in an airtight manner such that the first planar abutment surface and the first planar portion of the second abutment surface are disposed substantially parallel to each other with a first sealing portion therebetween, and a second sealing portion disposed between the first and second abutment surfaces and the second slanted portion to form a sealing reservoir portion,
   the second engine portion means being a die-formed member of an engine that includes vertical wall forming means for forming a vertical wall portion between the first planar portion and the second slanted portion of the second abutment surface with the vertical wall portion being perpendicular to the first planar portion such that a sharp corner is formed between the flat planar portion and the vertical wall portion,
   the first and second engine portion means being annularly arranged to define an inner sealed area with the second slanted portion of the second abutment surface being disposed on an inner side with respect to a direction of leakage,
   the second slanted portion of the second abutment surface being formed only on the inner side with respect to the first planer portion of the second abutment surface.

2. A seal structure comprising:
   a first member of an engine including a first flange having a first abutment surface;
   a second member of the engine that is a die-formed member including a second flange having a second abutment surface configured and arranged to be fixedly coupled to the first flange of the first member, the second abutment surface including
      at least one bolt fastening portion for fixedly coupling the first flange and the second flange by a bolt,
      a flat portion arranged substantially parallel to the first abutment surface of the first flange, and extending from a first transverse edge of the second abutment surface of the second flange, and
      a slanted portion slanted with respect to the flat portion, and extending from a second transverse edge of the second abutment surface that is opposite from the first transverse edge such that a distance between the first abutment surface and the second abutment surface becomes greater as moving away from the flat portion toward the second transverse edge to form a liquid gasket reservoir section, the slanted portion being formed only in portions of the second abutment surface other than the at least one bolt fastening portion; and
   a liquid gasket disposed between the first abutment surface of the first flange and the second abutment surface of the second flange to form a seal between the first and second abutment surfaces, the first and second flanges being annularly arranged to define an inner sealed area with the second transverse edge of the second abutment surface being disposed on an inner side with respect to a direction of leakage, the second abutment surface further including a vertical wall portion that connects the flat portion and the slanted portion of the second abutment surface, the vertical wall portion being perpendicular to the flat portion such that a sharp corner is formed between the flat portion and the vertical wall portion, and the slanted portion of the second abutment surface being formed only on the inner side with respect to the flat portion of the second abutment surface.

3. The seal structure according to claim 2, wherein the vertical wall portion is slanted with respect to the flat portion at a greater angle than the slanted portion.

4. The seal structure according to claim 2, wherein
the first member is a cylinder block of the engine,
the second member is an upper oil pan of the engine that is fixedly coupled to the cylinder block to form a crankcase, and
the liquid gasket forms an oil seal of the engine between the cylinder block and the upper oil pan.

5. The seal structure according to claim 4, wherein the first transverse edge of the second abutment surface is disposed on an external side of the engine and the second transverse edge of the second abutment surface is disposed on an internal side of the engine.

* * * * *